United States Patent [19]

Suzuki et al.

[11] Patent Number: 4,829,437
[45] Date of Patent: May 9, 1989

[54] SYSTEM AND METHOD FOR AUTOMATICALLY CONTROLLING A VEHICLE SPEED TO A DESIRED CRUISING SPEED

[75] Inventors: Kouichi Suzuki, Tokyo; Kyoji Kobayashi; Kiyoshi Konishi, both of Kanagawa, all of Japan

[73] Assignees: Nissan Motor Company, Ltd.; Jidosha Denki Kogyo Kabushiki Kaisha, both of Yokohama, Japan

[21] Appl. No.: 43,468

[22] Filed: Apr. 28, 1987

[30] Foreign Application Priority Data

May 1, 1986 [JP] Japan .................. 61-102441

[51] Int. Cl.$^4$ ............................................. B60K 31/00
[52] U.S. Cl. ............................. 364/426.04; 180/170; 180/179; 123/352
[58] Field of Search ............. 364/426.04, 431.07; 180/170, 176, 179; 123/352

[56] References Cited

U.S. PATENT DOCUMENTS

| 4,591,986 | 5/1986 | Nakajima et al. | 364/426 |
| 4,598,370 | 7/1986 | Nakajima et al. | 364/426 |
| 4,723,213 | 2/1988 | Kawata et al. | 364/426 |
| 4,725,969 | 2/1988 | Onogi et al. | 180/179 |

FOREIGN PATENT DOCUMENTS 59-8023 1/1984 Japan .

Primary Examiner—Gary Chin
Attorney, Agent, or Firm—Foley & Lardner, Schwartz, Jeffery, Schwaab, Mack, Blumenthal & Evans

[57] ABSTRACT

A system and method for automatically controlling a vehicle speed to a desired cruising speed in which after a vehicular engine is set in an acceleration state for the vehicle through an actuator under an acceleration control of the vehicle speed in response to a command operation of an acceleration switch, the vehicular engine is set so that the vehicle speed is reduced and arrives at a set cruising speed at a time of a reset of the command operation of the acceleration switch. At this time, in the vehicle speed controlling system and method, a duration in which the vehicle speed is one abruptly reduced is calculated on the basis of a control duration for which the vehicle speed is in the acceleration state under the acceleration control so that the vehicle speed is smoothly reduced and reaches the set cruising speed. The acceleration state of the vehicle speed is such that the actuator actuates a throttle valve to angularly displace toward an open direction so that the rate of increase in the vehicle speed with respect to time (i.e., acceleration value) is increased to match with a predetermined rate.

12 Claims, 4 Drawing Sheets

SYSTEM AND METHOD FOR AUTOMATICALLY CONTROLLING A VEHICLE SPEED TO A DESIRED CRUISING SPEED

BACKGROUND OF THE INVENTION

The present invention relates to a system and method for automatically controlling a vehicle speed to a desired cruising speed. The present invention is applicable to the system and method for automatically controlling the vehicle speed in which a running speed of a vehicle is automatically controlled to coincide with a desired set cruising speed.

Similar systems for automatically controlling vehicle speeds are exemplified by a Japanese Patent Application First Publication (Tokkai) No. sho 59-8023 published on Jan. 17, 1984.

In the above-identified Japanese patent application publication, the automatic vehicle speed controlling system includes a vehicle speed sensor which senses the actual vehicle speed and outputs an operation data in proportion to the actual vehicle speed, a command switch group for operatively outputting a cruise command signal, a memory for storing the operation data on the vehicle speed in response to an on-and-off operation of the command switch group, an actuator for actuating a throttle valve of a vehicular engine, and a control unit for transmitting a command to the actuator according to a difference between the actual vehicle speed and stored vehicle speed.

In the automatic vehicle speed controlling system, a set switch installed in the command switch group is operated to turn ON and thereafter to turn OFF so that the vehicle speed at the time of the OFF operation is stored into the memory. The control unit transmits the command to the actuator according to the difference between the stored vehicle speed and actual vehicle speed. At this time, the actuator is operated to actuate the throttle valve so that the vehicle speed is adjusted toward the stored vehicle speed to run the vehicle at the stored cruising speed. In addition, the actuator is operated to actuate the throttle valve so that the vehicle is accelerated in response to an ON operation of an accelerator switch incorporated in the command switch group. Furthermore, in response to the OFF operation of the acceleration switch the vehicle speed is constantly returned at the stored cruising speed at the time of the OFF operation of the accelerator switch. Such automatic vehicle speed controlling systems are convenient for the vehicle run on freeway roads.

Since, however, engine output characteristics, speed reduction ratio in a transmission, and vehicle body weight are individually different as the vehicle models to which the conventional vehicle speed controlling systems are applied are different, an abrupt deceleration duration $T_{ACC}$ . OFF, during which the actuator is operated so that the vehicle speed is abruptly reduced immediately after the OFF operation of the acceleration switch, needs to be adjusted for each vehicle model on which the above-described system is applied in a case when the vehicle constantly runs at the cruising speed at the time of the OFF operation of the acceleration switch after the acceleration switch is once operated to turn ON. If the adjustment of the abrupt deceleration duration is incomplete, the vehicle speed exhibits an overshooting or undershooting state until the vehicle speed is returned to and settles at the set cruising speed.

Since, in addition, the abrupt deceleration duration $T_{ACC}$. OFF is easily affected by a speed range in which the vehicle runs at the cruising speed, and by a road condition (ascending slope, or descending slope) if conditions to set the vehicle speed to the desired cruising speed are different, an optimum abrupt deceleration duration $T_{ACC}$. OFF meeting every condition cannot be set.

SUMMARY OF THE INVENTION

It is an object of the present invention to provide a system and method for automatically controlling vehicle speed to a desired cruising speed which is capable of setting an optimum abrupt deceleration duration $T_{ACC}$. OFF meeting every condition.

It is another object of the present invention to provide the system and method for automatically controlling vehicle speed to the desired cruising speed which enables the setting of the optimum abrupt deceleration duration $T_{ACC}$. OFF without the influence of a speed range in which the vehicle runs at the set cruising speed, road conditions, and the model of vehicles on which the system is applied.

The above-described object can be achieved by providing a system for automatically controlling a running speed of an object, comprising: (a) a switch; (b) first means for detecting the running speed; (c) second means for controlling the running speed so that an increase rate of the running speed is matched with a predetermined rate in response to a command operation of the switch; (d) third means for determining a first duration for which the second means has controlled the running speed to increase the running speed so as to coincide with the predetermined rate; (e) fourth means for calculating a second duration in which the running speed is reduced on the basis of the first duration determined by the third means in response to a reset of the command operation of the switch; and (f) fifth means for controlling the running speed so that the running speed is reduced in the second duration calculated by the fourth means and coincides with a cruising speed set in response to the reset of the command operation of the switch.

The above-described object can also be achieved by providing a system for automatically controlling a vehicle speed to a desired cruising speed, comprising: (a) first means for controlling the vehicle speed according to a controlled displacement position thereof; (b) second means for actuating the first means to displace at the controlled position in response to a command inputted thereto; (c) third means for operatively generating and outputting a set command to set the vehicle speed at a state in which the vehicle speed is increased at a predetermined rate; (b) fourth means for generating and outputting the command to the second means in response to the set command of the third means so that the rate of increase in the vehicle speed is adjusted to coincide with the predetermined rate; (e) fifth means for determining a control duration for which the vehicle speed is increased to coincide with the predetermined rate by the fourth means; (f) sixth means for detecting the vehicle speed; (g) seventh means for calculating a duration in which the vehicle speed is reduced on the basis of the control duration determined by the fifth means; and (h) eighth means for controlling the vehicle speed so that the vehicle speed coincides with a cruising speed, the cruising speed being set to the vehicle speed at the time of a reset of the set command of the third means, the eighth means once reducing the vehicle speed in the duration calculated by the seventh means and then controlling the vehicle speed so that the vehicle speed coincides with the set cruising speed.

The above-described object can also be achieved by providing a method for automatically controlling a vehicle speed to a desired cruising speed, comprising the steps of: (a) setting a vehicular engine so that vehicle speed is increased at a predetermined rate in response to a command operation of a first switch; (b) determining a first duration for which the vehicular engine is set so that the rate of increase in vehicle speed is adjusted so as to coincide with the predetermined rate; (c) calculating a second duration in which the vehicle speed is decreased and reaches a set cruising speed, the cruising speed being set in response to a command operation of a second switch, on the basis of the first duration determined in the step (b); and (d) setting the vehicular engine so that the vehicle speed is decreased in the second duration calculated in the step (c) in response to a reset of the command operation of the first switch.

DETAILED DESCRIPTION OF THE PREFERRED EMBODIMENT

Reference will hereinafter be made to the drawings in order to facilitate understanding of the present invention.

FIGS. 1 to 4(b) entirely show a preferred embodiment of the system for automatically controlling the vehicle speed to a desired cruising speed according to the present invention.

Figure 1:
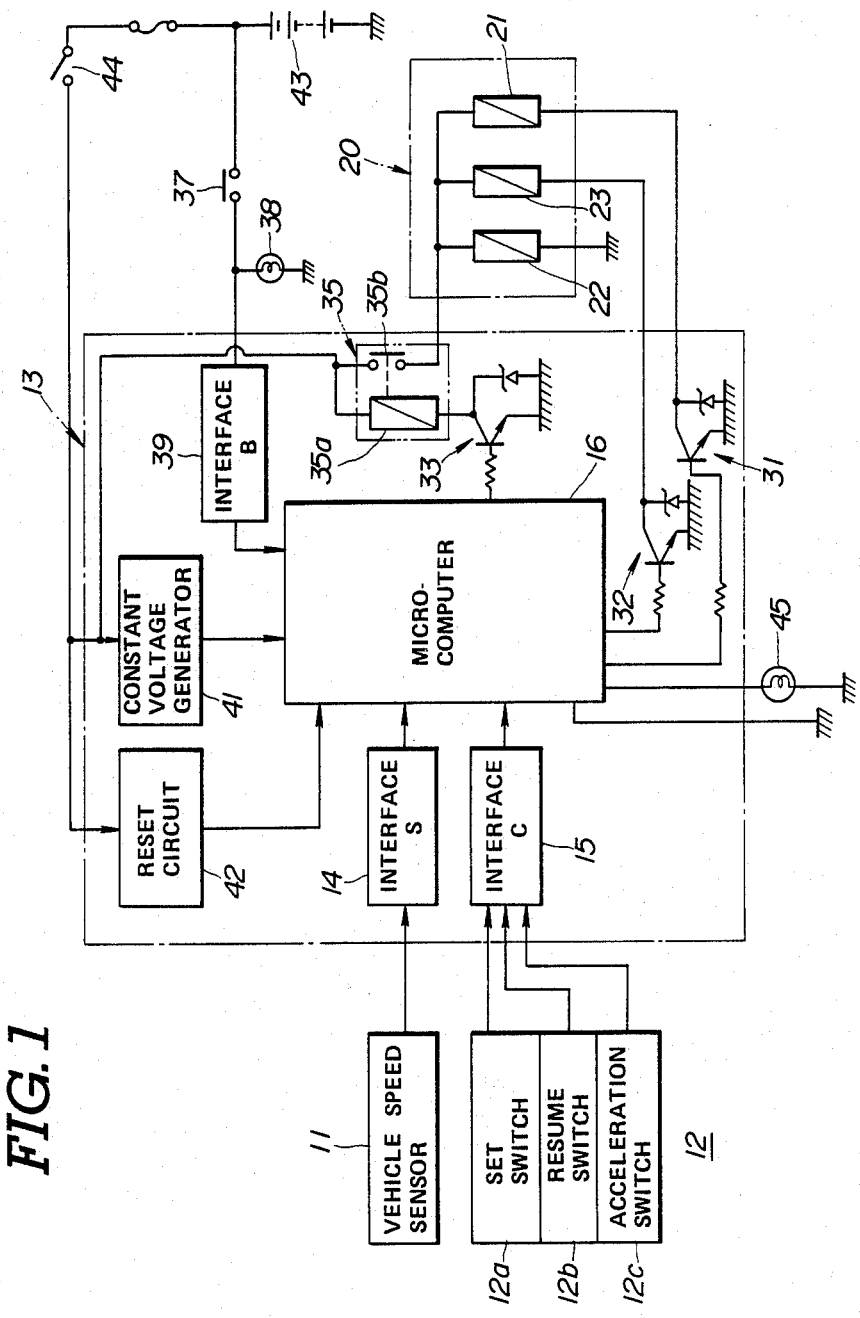
FIG. 1 is a schematic functional circuit block diagram of a preferred embodiment of a system for automatically controlling vehicle speed to the desired cruising vehicle speed.

In FIG. 1, a vehicle speed sensor 11 for detecting the vehicle speed and outputting a proportional data to the actual vehicle speed.

A command switch group 12 for outputting a series of command signals includes a set switch 12a, resume switch (also called reset switch) 12b, and acceleration switch 12c.

The output signals from the vehicle speed sensor 11 and command switch group 12 are supplied to a microcomputer 16 which serves as a control unit within a controller 13 via an interface 14 and via an interface 15, respectively.

The microcomputer 16 includes (a) a storage unit for storing the operational data (pulse signal) outputted from the vehicle speed sensor 11 in response to an operation of the set switch 12a in the command switch group 12, and (b) the control unit for supplying a command signal to an actuator 20 according to a difference between the actual vehicle speed and stored vehicle speed, for actuating the actuator 20 in an acceleration state in response to the ON operation of the accelerator switch 12c, for calculating an abrupt deceleration duration $T_{ACC}$. OFF of the actuator 20 which corresponds in time to a control duration during which the actuator 20 is set in the acceleration state immediately after the acceleration switch 12c is in the OFF state, and for actuating the actuator 20 in an abrupt deceleration state during the abrupt deceleration duration $T_{ACC}$. OFF.

Figure 2:
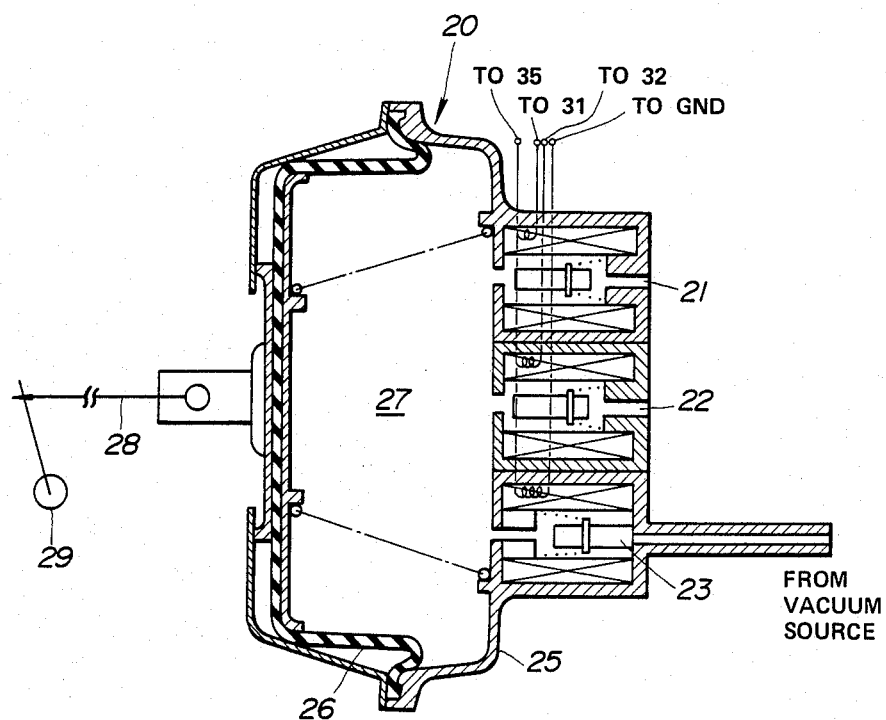
FIG. 2 is a sectional view of a construction of an actuator shown in FIG. 1.

A construction of the actuator 20 is depicted in FIG. 2.

As shown in FIG. 2, the actuator 20 includes a vent valve 21, a safety valve 22, and vacuum valve 23. Each end of the vent valve 21 and safety valve 22 are opened to the atmospheric pressure. One end of the vacuum valve 23 is connected to a vacuum source such as an intake manifold of the engine. The other ends of the respective valves 21, 22, 23 are communicated with a negative pressure chamber 27 formed with a casing 25 and one face of a diaphragm 26 (right side as viewed from FIG. 2). One end of a control wire 28 is connected to the other face (left side as viewed from FIG. 2) of the diaphragm 26. The other end of the control wire 28 is connected to a shaft 29 of the throttle valve.

Furthermore, a vent valve switching circuit 31 is connected between the microcomputer 16 and the vent valve 21 for controlling the on-and-off operation of the vent valve 21 connected thereto in response to the output signal from the microcomputer 16. A vacuum valve switching circuit 32 is connected between the microcomputer 16 and the vacuum valve 23 for controlling the on-and-off operation of the vacuum valve 23. In addition, an actuator switching circuit 33 is connected between the microcomputer 16 and actuator 20 for controlling the switching on-and-off of the power supply to the actuator 20 in response to the output signal from the microcomputer 16. The on-and-off switching of the power supply to the actuator 20 is carried out by means of a relay circuit 35. The relay circuit 35 includes a relay coil 35a and relay contacts 35b. Each switching circuit 31, 32, and 33 includes a resistor, transistor and zener diode as appreciated from FIG. 1.

A brake switch 37 which closes and supplies a signal to an interface B 39 when a brake pedal of the vehicle is depressed by a predetermined stroke. A brake lamp 38 is connected to the interface B 39 which is lighted when the brake (brake pedal) is operated (depressed by the predetermined stroke). A signal for cancelling the operation of the whole system is transmitted to the microcomputer 16 via the interface B 39 in the controller 13 from the brake switch 37 when the brake switch 37 is closed.

It is noted that in FIG. 1 numeral 41 denotes a constant voltage generator for the microcomputer 16, 43 denotes a power supply such as a vehicle battery, 44 denotes a main switch for supplying a bias voltage for the whole controller 13 when it is closed, and 45 denotes a cruise lamp for indicating a state of the cruise speed control.

Next, an operation of the embodiment of the system for automatically controlling vehicle speed to the desired cruising speed will be described with reference to FIGS. 1 through 4(b).

First, when the main switch 44 is closed, the automatic vehicle speed controlling system is initialized. At this time, the vehicle speed sensor 11 outputs a pulse signal representing an operational data in proportion to the actual vehicle speed. The pulse signal is inputted to the microcomputer 16 within the controller 13 and is sampled within a constant period of time. The microcomputer 16 always recognizes the number of pulses in proportion to the vehicle speed. In this state, when the set switch 12a is set to the on state to transmit the set signal to the microcomputer 16 and thereafter the set switch 12a is set in the off state to release the set signal, the cruise lamp 45 is lighted and the microcomputer 16 sets the vent valve 21 and safety valve 22 in the on state to close both valve inlets thereof in order to interrupt the negative pressure chamber 27 from being exposed to the atmospheric pressure. The microcomputer 16 also sets the vacuum valve 23 in the on state to open an inlet of the vacuum valve 23 so that a negative pressure from the intake manifold is introduced into the negative pressure chamber 27. Thus, the throttle valve shaft 29 is pivoted and held at a predetermined angular position. Thereafter, although the driver releases from an accelerator pedal of the vehicle, the vehicle is run at a cruising speed which the driver desires since the throttle valve shaft 29 is held at the predetermined position.

Thereafter, the microcomputer 16 outputs the command signal to the actuator 20 so that the number of pulses proportional to the detected actual vehicle speed becomes equal to the stored number of pulses (, i.e., stored vehicle speed). Then the microcomputer 16 controls the negative pressure state within the negative pressure chamber 27 of the actuator 20 by controlling the on-and-off operation of both the vent valve 21 and vacuum valve 23. When, for example, the actual vehicle speed becomes a predetermined value smaller than the stored vehicle speed, the operation of the vacuum valve switching circuit 32, controlled by means of the microcomputer 16, causes the vacuum valve 23 to turn on to introduce the negative pressure from the intake manifold into the negative pressure chamber 27. This causes the throttle valve shaft 29 to slightly pivot in the open direction, thus the vehicle speed is increased.

On the other hand, when the actual vehicle speed becomes the predetermined value or larger than the stored vehicle speed, the vent valve switching circuit 31 controlled by the microcomputer 16 is operated to turn the vent valve off so that the atmospheric pressure is introduced into the negative pressure chamber 27. Therefore, the throttle valve shaft 29 is slightly pivoted in the close direction to reduce the vehicle speed. In this way, the vehicle speed is constantly controlled in a manner of repeating such an operation as described above.

When the automatic control of vehicle speed is initiated, a program is also run. The program flowchart is shown in FIG. 3.

Figure 3:
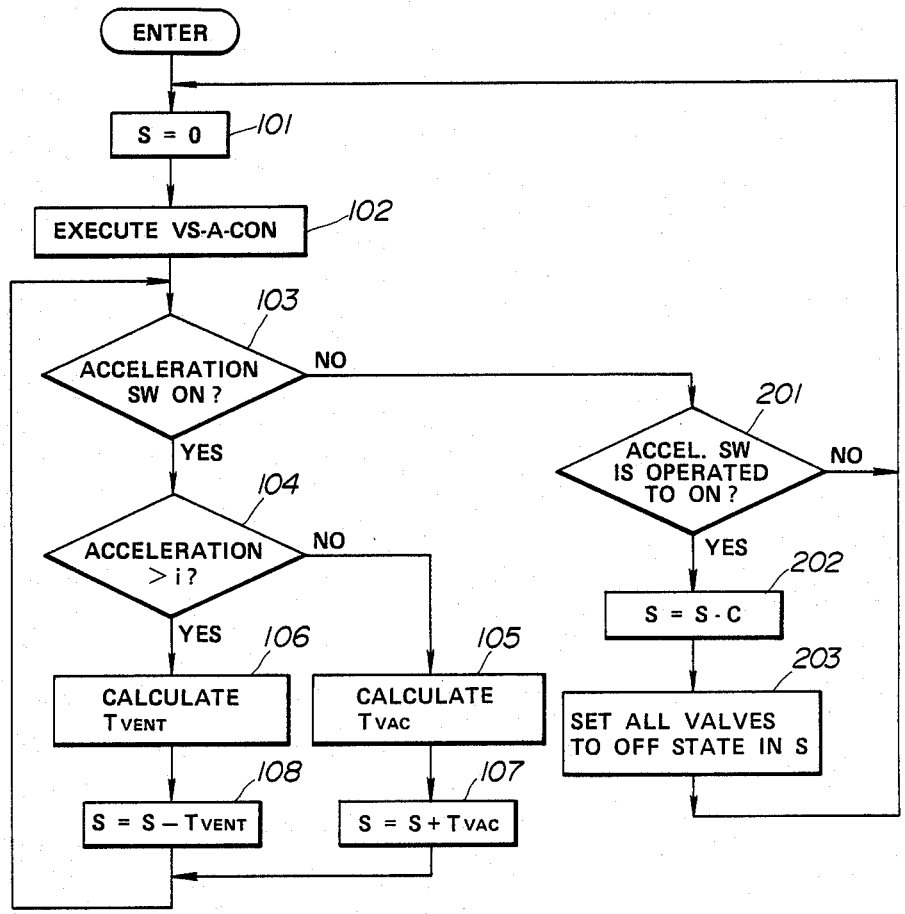
FIG. 3 is a flowchart of a control program routine executed in a microcomputer shown in FIG. 1.
Figure 4:
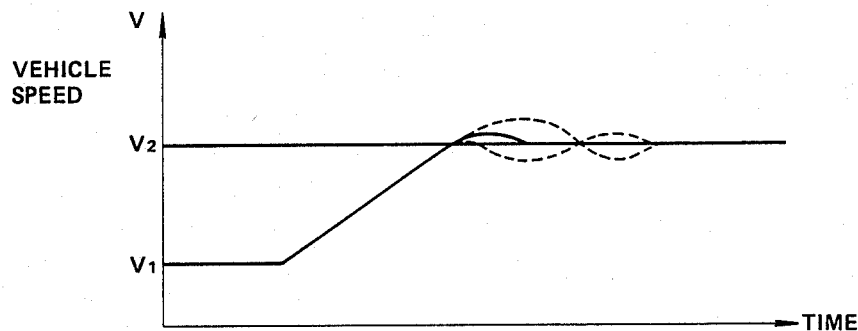
FIGS. 4(a) and 4(b) are timing charts of vehicle speed characteristics and respective signals in the automatic vehicle speed controlling system shown in FIG. 1.
Figure 4:
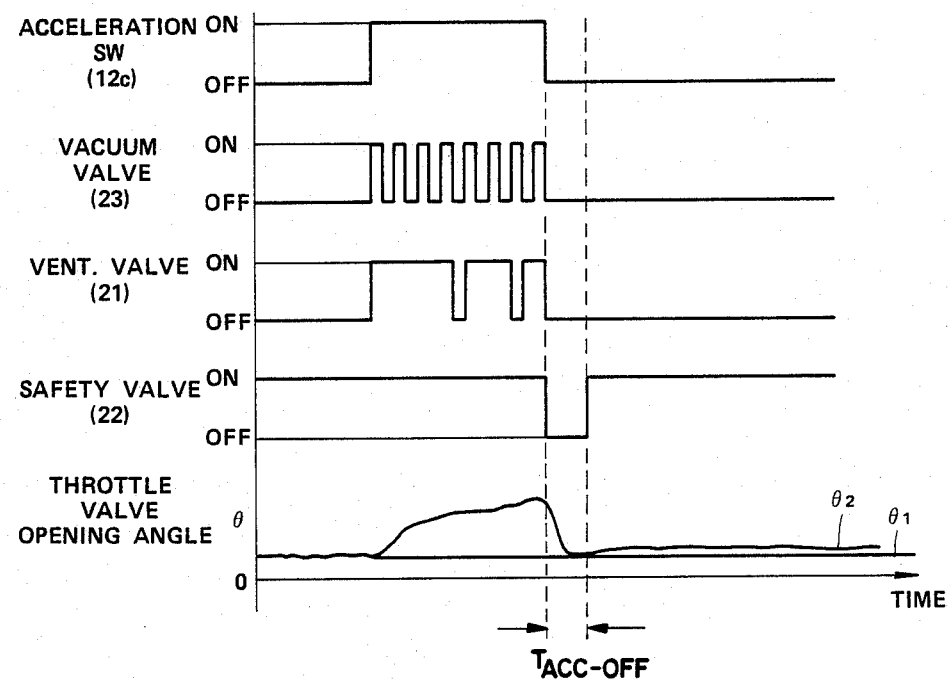

That is to say, as shown in FIG. 3, in a step 101, the microcomputer 16 resets a time S (abrupt deceleration duration $T_{ACC}$. OFF). In a step 102, the microcomputer 16 carries out the vehicle speed automatic control (EXECUTE VS.A.CON). In detail, in the step 102, after the set switch 12a is set to ON, the vehicle speed automatic control is, in turn, initiated in response to the switching off of the set switch 12a as described above. At this time, the abrupt deceleration duration $T_{ACC}$. OFF is in the reset state (S=0).

In a step 103, the microcomputer 16 determines whether the acceleration switch 12c is operated to turn on. When the acceleration switch 12c is operated to turn on in the step 103 (YES), a constant acceleration control is initiated in response to the switching on of the acceleration switch 12c. In detail, in order to improve an acceleration characteristic and acceleration feeling, a throttle opening angle θ of the throttle valve shaft 29 with respect to a full close position of the throttle valve becomes wide as compared with that in the case of the actually increasing vehicle speed, as denoted by a bold solid line shown in FIG. 4(b).

In a step 104, when transferring the speed control to the vehicle speed control at the constant acceleration in the step 103, the microcomputer 16 determines an acceleration value. That is to say, the microcomputer 16 determines whether the present acceleration value is greater than a set acceleration value i. The present acceleration value is a result of subtraction of a previous vehicle speed from the present vehicle speed with respect to a time corresponding to one operation cycle of the program flowchart. If the present acceleration value is smaller than the set acceleration value i (NO), the microcomputer 16 determines that the vehicle is in a gentle acceleration state as compared with a predetermined acceleration state through the constant acceleration control. In a step 105, the microcomputer 16 calculates a present vacuum valve operation duration $T_{VAC}$ (that is to say, a duration for which the vacuum valve 23 is open), operates the vacuum valve switching circuit 32 (on state only during the calculated vent valve operation duration $T_{VENT}$) to open the inlet of the vacuum valve 23 (ON).

In the step 104, when the present acceleration value is greater than the set acceleration value i (YES), the microcomputer 16 determines that the vehicle is in an abrupt acceleration state as compared with the predetermined acceleration state through the constant acceleration control. Then, in a step 106, the microcomputer 16 calculates a present vent valve operation duration $T_{VENT}$ (That is to say, a duration for which the vent valve 21 is closed). The vent valve switching circuit 31 is operated (on state only during the vent valve operation duration $T_{VENT}$) to close the inlet of vent valve 21 (OFF).

In addition, in a step 107, the microcomputer 16 adds the vacuum valve operation duration $T_{VAC}$ calculated in the step 105 to the time S to derive a new time S.

In a step 108, on the other hand, the microcomputer 16 subtracts the vent valve operation duration $T_{VAC}$ calculated in the step 106 from the time S to derive the new time S.

Furthermore, the routine returns from the steps 107 and 108 to the step 103 and the routine repeats in close loops including steps 103, 104, 105, and 107 and the steps 103, 104, 106, and 108 until the acceleration switch 12c is, in turn, in the off operation, i.e., until the constant acceleration control is completed. At this time, the time S is adjusted through the operation duration $T_{VAC}$ or $T_{VENT}$ of either the vacuum valve 23 or vent valve 21.

Then, in a case when the microcomputer 16 determines that the acceleration switch 12c is not in the on state (NO) in the step 103, the routine goes to a step 201 in which the microcomputer 16 determines whether after the acceleration switch 12c is once operated to turn on, the acceleration switch 12c is operated to turn off. That is to say, the microcomputer 16 determines whether the vehicle speed is under the control of the constant acceleration control.

If the acceleration switch 12c is not operated to turn off (NO), the microcomputer 16 determines that the constant acceleration control is not carried out.

In this case, the microcomputer 16 determines that the vehicle is in the cruising speed running state under the vehicle speed automatic control and the routine returns to the step 101. The program is in the close loop state between the steps 101 through 103 and step 201 until the acceleration switch 12c is operated to turn on so that the control is transferred to the constant acceleration control.

On the other hand, if in the step 201, the acceleration switch 12c is operated to turn off after one on operation is carried out (YES), the microcomputer 16 determines that the acceleration control is ended in response to the switching off of the acceleration switch 12c. Then the routine goes to a step 202 in which the time S (that is to say, abrupt acceleration duration $T_{ACC}$. OFF) is calculated from such an equation as S=S(time)×C(constant). That is to say, the abrupt acceleration duration $T_{ACC}$. OFF is determined chiefly by the operation duration $T_{VAC}$ of the vacuum valve 23 in the constant acceleration state in addition to the operation duration $T_{VENT}$ of the vent valve 21.

In other words, the abrupt deceleration duration $T_{ACC}$. OFF can be calculated from an equation (1) as expressed below.

$$T_{ACC} \cdot \text{OFF} = \int_0^{tn} T_{VAC} - \int_0^{tn} T_{VENT} \cdot C \qquad (1)$$

Therefore, the adjustment of the abrupt decleration duration $T_{ACC}$. OFF is not needed for each model of vehicles although the engine output characteristics, speed reduction ratio, or weight of the vehicle is different depending on vehicles on which the system in the embodiment is applied.

In a step 203, during the time S calculated in the step 202, all valves 21, 22, and 23 are in the off state (all inlets thereof are closed) in order to actuate the actuator 20 in the abrupt deceleration state. That is to say, as shown in FIG. 4(b), the opening angle θ of the throttle valve shaft 29 is once returned to the opening angle $θ_2$ corresponding to the vehicle speed $V_1$ and then the throttle valve shaft 29 is adjusted to the opening angle $θ_2$ corresponding to the vechicle speed $V_2$ at the time of an OFF operation of the switch 12c (a vehicle speed at the time of the switching off of the acceleration switch 12c, i.e., stored vehicle speed).

Then, the routine returns to a step 101, in which the vehicle runs at the cruising speed with the opening angle $θ_2$ of the throttle valve shaft 29 adjusted in the step 203.

Hence, the constant acceleration control is carried out in response to the switching on of the acceleration switch 12c. Since from the abrupt acceleration duration $T_{VENT}$ of the vacuum valve 23 until the acceleration switch 12c is in the OFF state and from the operation duration $T_{VENT}$ of the vent valve 21, the abrupt deceleration duration $T_{ACC}$. OFF is calculated using the equation (1), the adjustment of abrupt deceleration duration $T_{ACC}$. OFF is not necessary for each vehicle on which the system is applied. Since during the abrupt deceleration duration $T_{ACC}$. OFF all valves 21, 22, and 23 are in the OFF state, the overshooting and undershooting of vehicle speed control can be prevented.

It is noted that although, in the preferred embodiment, the actuator 20 is described as a negative pressure control system having the vent valve 21, safety valve 22, and vacuum valve 23, a motor driven actuator for actuating the throttle valve shaft 29 in accordance with the command issued by the microcomputer 16 or a positive pressure controlled actuator having an air valve, supply valve, and release valve may alternatively be used.

As described hereinabove, since in the system and method for automatically controlling vehicle speed to the desired cruising speed according to the present invention, after the actuator is accelerated under the constant acceleration control in response to the switching on of the accelerator switch, the vehicle runs at the vehicle speed set at the time of the switching off of the acceleration switch. The abrupt deceleration duration $T_{ACC}$. OFF of the actuator is calculated on the basis of a duration of control during which the actuator is in the acceleration state. Immediately after the switching off of the acceleration switch and during the calculated abrupt deceleration duration $T_{ACC}$. OFF, the actuator is controlled in the abrupt deceleration state. The abrupt deceleration duration $T_{ACC}$. OFF can be fitted to every condition without influence of the vehicle on which the system is applied, the road condition, or the speed range in which the vehicle runs. Therefore, no adjustment of the abrupt deceleration duration $T_{ACC}$. OFF is required for each vehicle on which the system is applied thus overshooting and undershooting problems can be eliminated.

It will fully be understood by those skilled in the art that the foregoing description is made in terms of the preferred embodiment and various changes and modifications may be made without departing from the scope of the present invention which is to be defined by the appended claims.

What is claimed is:

1. A system for automatically controlling a running speed of an object, comprising:
    (a) switch for setting and resetting a command operation signal;
    (b) first means for detecting the running speed of said object;
    (c) second means for controlling the running speed so that an increase in the running speed is matched with a predetermined rate of increase in response to said command operation signal being set by the switch means;
    (d) third means for determining a first time duration during which the second means controlled the running speed of the object to increase at the predetermined rate;
    (e) fourth means responsive to a resetting of said command operation signal for calculating a second duration during which a controlled deceleration of the running speed must be commanded in order for the running speed to achieve a desired value without hunting; and
    (f) fifth means responsive to resetting of said command operation signal for commanding said controlled deceleration of the running speed so that the running speed is reduced during the second duration calculated by the fourth means to achieve said desired value.

2. The system according to claim 1, wherein the third means adds to the first duration a third duration for which the running speed is increased so that the increase of the running speed coincides with the predetermined rate and subtracts from the first duration a fourth duration for which the running speed is reduced so that the increase of the running speed coincides with the predetermined rate.

3. A system for automatically controlling a vehicle speed to a desired cruising speed, comprising:
    (a) first means for controlling the vehicle speed according to a controlled displacement position of said first means;

(b) second means for displacing the first means to a controlled position in response to a command inputted thereto;

(c) third means for operatively generating and outputting a set command to set the vehicle speed at a state in which the vehicle speed is increased at a predetermined rate;

(d) fourth means for generating and outputting the command to the second means in response to the set command of the third means so that the rate of increase in the vehicle speed is adjusted to coincide with the predetermined rate;

(e) fifth means for determining a control duration for which the vehicle speed is increased to coincide with the predetermined rate by the fourth means;

(f) sixth means for detecting the vehicle speed;

(g) seventh means for calculating a duration during which the vehicle speed is reduced and (h) eighth means for controlling the vehicle speed so that the vehicle speed coincides with said cruising speed, the cruising speed being set to the vehicle speed at the time of a reset of the set command of the third means, the eighth means once reducing the vehicle sped during the duration calculated by the seventh means and then controlling the vehicle speed so that the vehicle speed coincides with the set cruising speed.

4. The system according to claim 3, wherein the first means comprises a throttle valve of a vehicular engine and wherein the second means comprises:

(a) a casing;

(b) a diaphragm one end surface thereof connected to a pivotal shaft of a throttle valve;

(c) a first valve installed in the casing for introducing the atmospheric pressure when it is opened in response to the command;

(d) a second valve installed in the casing for introducing the atmospheric pressure when it is opened in response to the command;

(e) a third valve installed in the casing for introducing a vacuum pressure when it is opened in response to the command; and (f) a pressure chamber configured by the other end surface of the diaphragm, and the first, second, and third valves for actuating the throttle valve shaft in the open direction when the vacuum pressure is introduced thereinto and actuating the throttle valve shaft in the close direction when the atmospheric pressure is introduced thereinto.

5. The system according to claim 4, wherein the fourth means comprises:

(a) ninth means for determining whether the vehicle speed is increased at the predetermined rate; and (b) tenth means for generating and outputting the command so that the first valve is opened to increase the vacuum pressure in the pressure chamber when the ninth means determines that the vehicle speed increase rate is smaller than the predetermined rate and the third valve is opened to decrease the vacuum pressure in the pressure chamber when the ninth means determines that the vehicle speed increase rate is greaater than the predetermined rate;

6. The system according to claim 5, wherein the fifth means determines the control duration in such a way that the duration for which the third valve is opened is added to a current duration and the duration for which the first valve is opened is subtracted from the current duration.

7. The system according to claim 6, wherein the seventh means calculates the duration from the current duration determined by the fifth means multiplied by a constant.

8. The system according to claim 4, wherein the eighth means reduces the vehicle speed by closing all of the first, second, and third valves in the duration calculated by the seventh means.

9. A method for automatically controlling a vehicle speed to a desired cruising speed, comprising the steps of:

(a) setting an operational parameter of a vehicular engine so that the vehicle speed is increased at a predetermined rate in response to a command operation produced by actuation of a first switch;

(b) determining a first duration during which the vehicular engine operational parameter is set so that the rate of increase in vehicle speed is adjusted so as to coincide with the predetermined rate;

(c) calculating a second duration in which the vehicle speed is decreased from a current vehicle speed and reaches a set cruising speed, the cruising speed being set in response to a command operation of a second switch and (d) setting another operational parameter of the vehicular engine so that the vehicle speed is decreased in the second duration calculated in the step (c) in response to a reset of the command operation produced by actuation of the first switch.

10. A system for a vehicle, comprising:

(a) first means for detecting a current vehicle speed;

(b) second means for operatively outputting a cruise command signal to command the vehicle to run at the current vehicle speed as a desired cruise speed;

(c) third means for operatively outputting an acceleration command signal to command the vehicle to run at a constant acceleration from the current vehicle speed;

(d) fourth means responsive to the cruise command signal for outputting a first control command signal so that an operating variable of an engine driving force adjusting mechanism is adjusted to a first target opening angle through which the vehicle speed is maintained at the desired cruise speed set by the second means, said fourth means responsive to the acceleration command signal to command the vehicle to run at the constant acceleration and outputting a second control command signal so that the operating variable of the engine driving force adjusting mechanism is adjusted to a second target operating variable so that the vehicle runs at the constant acceleration;

(e) fifth means responsive to the first and second control command signals for actuating the engine driving force adjusting mechanism;

(f) sixth means for determining a time duration during which the operating variable of the engine driving force adjusting mechanism is returned to a third operating variable and through which the vehicle cruises at the vehicle speed before the constant acceleration command signal is issued from the third means on the basis of the duration of time during which the vehicle speed is increased during the constant acceleration, when control by the fourth means is transferred from the constant acceleration control to the cruise speed control; and (g) seventh means responsive to a reset of the constant acceleration command signal for returning the operating variable of the engine driving force adjusting mechanism to the third operating variable during the duration of time determined by the sixth means, said fourth means thereafter outputting the first control command signal to the fifth means so that the vehicle speed coincides with the desired cruise speed.

11. A system as set forth in claim 10, wherein the fifth means comprises a normally open safety valve, a normally open vent valve for allowing atmospheric pressure into a chamber configured by a diaphragm which is linked to an engine throttle valve, and acts as the engine driving force adjusting mechanism, so that the opening angle of the throttle vaive is decreased, and a normally closed pressure supply valve for allowing a vacuum pressure into the chamber so that the opening angle of the throttle valve is increased, and wherein the sixth means determines said duration of time on the basis of a duration of time during which only the vacuum pressure supply valve is open.

12. A system as set forth in claim 10, wherein the third operating variable is in a range between the first operating variable and a second operating variable.

* * * * *